US012697690B2

(12) United States Patent
Wittrien, IV

(10) Patent No.: US 12,697,690 B2
(45) Date of Patent: Aug. 4, 2026

(54) TOOL TO REMOVE EXCESS WELD MATERIAL AND METHOD TO USE

(71) Applicant: Alfred Harold Wittrien, IV, Folkston, GA (US)

(72) Inventor: Alfred Harold Wittrien, IV, Folkston, GA (US)

( * ) Notice: Subject to any disclaimer, the term of this patent is extended or adjusted under 35 U.S.C. 154(b) by 467 days.

(21) Appl. No.: 18/374,922

(22) Filed: Sep. 29, 2023

(65) Prior Publication Data

US 2025/0108464 A1     Apr. 3, 2025

(51) Int. Cl.
B23K 37/08          (2006.01)

(52) U.S. Cl.
CPC .................................... B23K 37/08 (2013.01)

(58) Field of Classification Search
None
See application file for complete search history.

(56) References Cited

U.S. PATENT DOCUMENTS

| | | | | |
|---|---|---|---|---|
| 3,783,722 | A * | 1/1974 | Bosworth ............ | B23D 79/023 |
| | | | | 83/861 |
| 4,269,552 | A * | 5/1981 | Unigovsky .......... | B23D 79/021 |
| | | | | 409/300 |
| 4,822,221 | A * | 4/1989 | Illakowicz ........... | B23D 79/023 |
| | | | | 409/313 |
| 5,899,795 | A * | 5/1999 | Penza .................. | B23D 79/023 |
| | | | | 451/61 |
| 2018/0001422 | A1* | 1/2018 | Rajagopalan ........ | B23K 26/282 |
| 2019/0022773 | A1* | 1/2019 | Choi ......................... | B23C 3/12 |

* cited by examiner

*Primary Examiner* — Laura C Guidotti
*Assistant Examiner* — Dana Lee Poon
(74) *Attorney, Agent, or Firm* — Lawrence J. Gibney

(57) ABSTRACT

Base metal repairs are necessary to maintain the integrity of the interior flow within piping systems aboard ships. As fluids travel through piping internal degradation of the piping occurs and must be repaired to ensure that the flow remains uninterrupted. Additional material is added to correct the problem by welding; however, the excess weld material must be removed to ensure uniform flow through the piping system. The excess weld material must be removed, and this tool has been designed to remove the excess weld material to produce a uniform result.

4 Claims, 4 Drawing Sheets

TOOL TO REMOVE EXCESS WELD MATERIAL AND METHOD TO USE

BACKGROUND OF THE INVENTION

A. Field of the Invention

This device will be used in many shipboard applications or any installation involving piping systems. There are a multitude of piping systems on maritime vessels, and it is important to ensure that the piping systems remain intact and functional. Maritime vessels are subjected to materials and fluids—salt water primarily—that will degrade piping systems. Additionally, cavitation may occur in piping, which will cause pitting of the interior of the piping; this cavitation is another source of degradation of the piping and will cause interrupted flow within the pipe. Piping systems will suffer some degradation, possibly even some failure when components such as piping require maintenance and the maintenance is not performed. The degradation creates inconsistencies on the inside diameter of the pipe that disrupts flow and violates minimum wall thickness requirements. These inconsistencies must be repaired to ensure that the piping system functions properly. This maintenance typically involves cutting out existing pipes which are then replaced or repaired, usually with welding sections of piping. If the pipe only requires a repair, this type of repair would involve welding that will leave excess weld material on the pipe. Procedures are required to ensure a quality weld joint, and many of these weld joints have exact tolerances. The process aboard ships to repair a piping section using welding is known as a base metal repair (BMR).

The base metal repair (BMR) process for shipboard applications often requires that the process be completed by hand. This process yields excess material and often inconsistent results, that must be machined to satisfy exact tolerances including Inside diameter, outside diameter, counter bore depth, nozzle depth and bevel angle. The purpose of the base metal repair and machining process is to restore the pipe, valve, or fitting to exact dimensions for proper Fit-Up and continued use. This tool will provide a way to produce a clean uniform interior dimension, exterior dimension, counterbore depth, nozzle depth, and bevel surface to shipboard piping systems and components.

B. Prior Art

There are many prior art references that teach tools that grind piping surfaces, both on the outside and interior surfaces of piping.

A representative example of this type of device can be found at Girndt, U.S. Pat. No. 5,175,964, which is a device that will remove flaws from the interior surface of piping in the oil and gas industry. This device can be used with water piping systems but the device is not used during a base metal repair and the tool in Girndt is installed in the pipe and travels within the interior of the pipe to remove flaws.

Another example can be found at Penza, U.S. Pat. No. 6,264,537, which is a tool that is used to remove excess weld material but is a tool that is pulled through the section of piping. The operation of the tool with the present application and the operation of the Penza tool are completely different from each other and Penza does not teach or anticipate the operation of the present tool.

Another tool that is used to reduce excess weld material in piping can be found at Badrak US Patent Publication 2004/0155091. While the tools seek to achieve the same result, the tools operate in completely different manners and the present tool is not anticipated or taught by the Badrak tool.

There are other examples and the cited references are a representative sample of the tools that are found in the prior art.

BRIEF SUMMARY OF THE INVENTION

The process of piping degradation in shipboard piping system is gradual but also inevitable due to extended periods of exposure to fluids. Certain methods are used to test the integrity of the piping. Some tests may include visual inspection and non-destructive testing including ultrasonic testing. When it becomes necessary to repair piping that has become degraded, the piping is cut, and material is added to the interior and exterior of the pipe through a welding process. This process is commonly referred to as a base metal repair (BMR). The welding is performed on the interior and exterior of the pipe or component to restore wall thickness and provide the material required for the machining process. However, the welding process will add excess material to the interior and exterior of the pipe that must be removed to achieve a satisfactory Fit-Up and insure unobstructed flow. It is imperative that the flow of liquid through piping systems is unimpeded and piping systems have exact tolerances that must be satisfied.

One of the challenges aboard ships is cramped spaces that limit the use of large traditional end prep machines. Another is that many are designed to mount to the inside diameter, which is no longer consistent due to system degradation. Lastly, many components cannot be prepped shipboard with a machine due to their configuration or placement such as valves, elbows, and tees. These components are traditionally prepped on a lathe or by hand. This tool is specifically designed to overcome these limitations. Onboard ships the craftsman would machine the End-Prep surface by hand; this process, however, would often not produce uniform results because of the reliance on the skill of the craftsman. The device in this application will enable the user to create a uniform surface on the interior, exterior, set counterbore and nozzle depth and produce a consistent bevel.

The current tool mounts on the outside surface of the pipe, fitting, elbow etc. and will allow the completion of the process while producing a uniform surface; support plates are used to mount the tool to the component that is being repaired. The traditional machines that are used currently are too large and will not conform to the space limitations that are found on many shipboard applications and because of the cramped spaces the work was done by hand, usually by operating a handheld bur or grinding device.

The tool is mounted to the outer diameter of the pipe and a support plate for the tool is provided; a graduated scale is provided to ensure a consistent distance relative to the center of the component as the tool is being used. This consistent distance will make sure that the interior, exterior, and bevel face surfaces of the component are uniform. A bearing in the center of the tool locks the shank of a bur attached to a die grinder in place. Burs, die grinders and angle grinders are routinely used to shape the interior, exterior and bevel face of components. This tool results in a compact tool to complete the processes and removes the human error factor.

By way of example a system which is critical in a submarine is the trimming system, which maintains the position of the submarine on a horizontal axis as well as a vertical axis. The trimming of the vessel occurs by transferring saltwater within piping systems for that purpose.

Submarines have many space constraints and many different types of piping configurations including straight piping, elbows, tees, valves ect. are used in this system to transfer the fluid within the piping for the trimming system. This tool is a portable tool and is designed to be placed on both the valve for the valve configuration, pipe configuration, tee configuration, or elbow configuration. Although they are slightly different positions, the tool will operate in the same way, regardless of whether it is on a valve, pipe, tee, or an elbow configuration.

Before the section of piping for the trimming system has been repaired, the tool is mounted temporarily on a section of piping for the trimming system, for instance. On the side of the piping will be several bearing mounts that will secure the tool and allow the guide bearing to be mounted; the guide bearing will secure a grinding tool that can then be manipulated by the craftsman to produce the uniform interior surface, exterior surface, counterbore depth, nozzle depth, and bevel while removing the excess weld material. The tool will be fully mounted and centered to the existing component prior to beginning the BMR process. At this point the support plate will be torqued into place. Once the main bearing has been properly aligned and the support plate torqued the main bearing and telescoping mounting rods may be removed. They have been specifically designed with mounting tolerances and spot facing that ensure that they can be reinstalled into the same position. Once the main bearing and telescoping mounting rods have been removed the BMR process can begin. Once the BMR process has been completed the telescoping mounting rods and main bearing tool can be reinstalled and the End-Prep process begins.

NUMBERING REFERENCE

Figure 1:
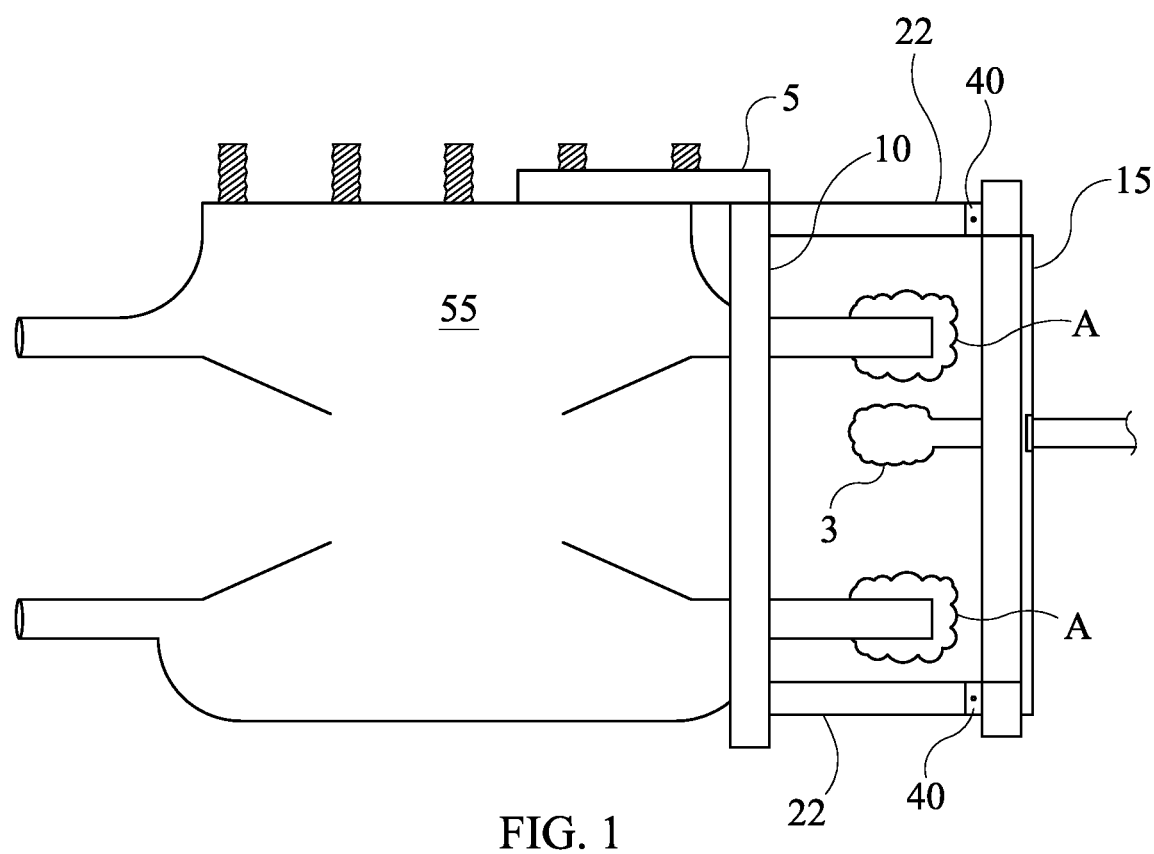
FIG. 1 is a side view of the tool on a valve.

2 Interior of the Pipe
3 Bur Tool
5 Horizontal Plate
10 Support Plate
14 Main bearing
15 Outer Race
16 Inner Race
16A Hole for the mounting screw
16B Hole for the mounting screw
17 Empty Space
20 Bearing Mount
21 Opening for Telescoping Rods
22 Telescoping Rods
25 Guide Bearing
26 Piping Piece
30 Integrated Scale

31 Adjustable Arm
40 Stop
45 Set Screw
46 Inner Race Take Down Bolt
50 Opening for bur tool
55 Valve
60 Existing Component
65 New Component
70 Completed Fit-Up
A Excess Weld Material
E Elbow
R Side of Angle Iron
S Side of Angle Iron
V Metal Strap to secure tool

DETAILED DESCRIPTION OF THE EMBODIMENTS

In many shipboard applications it is often necessary to judge the integrity of the pipe system and then maintain the integrity of the piping system. This can be done in different ways, including ultrasonic testing, as well as visual means, as fluids run through piping systems and especially through piping systems that are installed on ships that are exposed constantly to salt water. Cavitation, which is a phenomenon that produces bubbles or voids, may also occur within piping surfaces due to irregular piping surfaces that are found within the piping system. Internal erosion or cavitation of the interior surface of the pipe will inevitably occur.

In order to maintain the integrity of the pipe, it is necessary to add weld material (excess weld material) to the interior and exterior of a section of piping to maintain proper pipe thickness. However, once weld material is added to the interior or exterior of a pipe section to restore wall thickness, the excess weld materials must be removed by a grinding tool or bur to ensure that there is no obstruction of the fluid within the interior of the pipe and the piping system is within the tolerances for fit-up. In addition to unobstructed flow there are many dimensional requirements with exacting tolerances that must be met to ensure quality welds. This process of adding material to restore thickness is referred to as a base metal repair or BMR. This tool is used to complete the End Prep process by removing the excess weld material. Quality end-preps are vital in producing first time quality fit-ups, and subsequently first time quality welds.

This tool will be used in several different scenarios after a base metal repair. Base metal repair (BMR) is performed when piping is cut away and weld material needs to be added to restore the interior thickness of a pipe, valve, or fitting. The tool can be used on a section of piping that has been cut for reassembly, on a valve, straight section of piping, an elbow, or tee configuration that is used with shipboard applications.

During the End-Prep process handheld tools such as die grinders and angle grinders for example are used to produce the uniform piping surface that is required. This tool does not replace the die grinder but reduces the amount of human error or inconsistency that is produced when the skilled tradesman is using a bur or grinding wheel.

As stated before the tool can be used in a variety of piping configurations and while each application will differ slightly depending on the exact type of piping system, the process remains the same.

Figure 2:
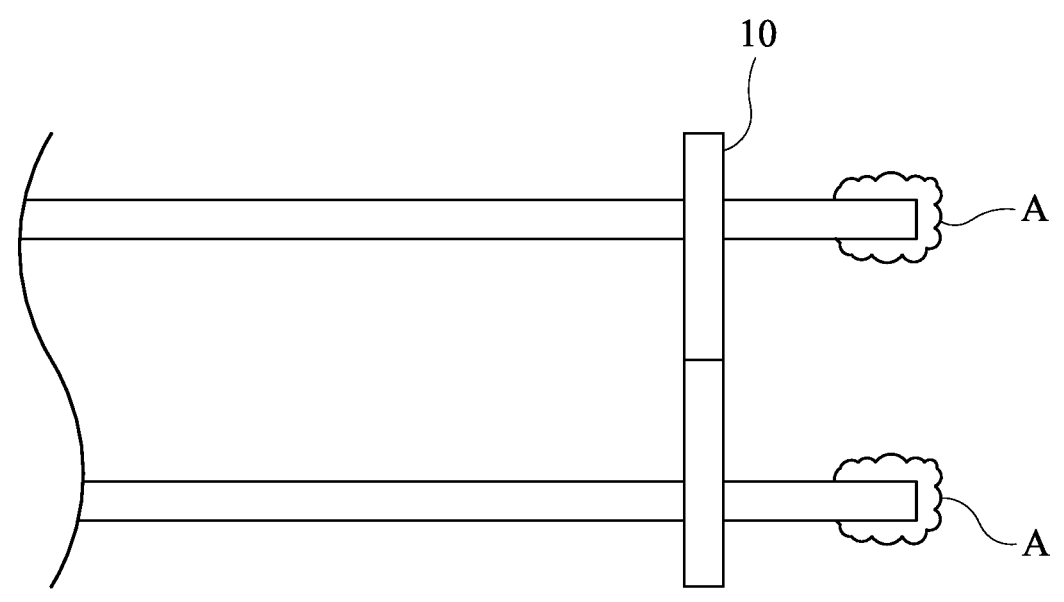
FIG. 2 is side view of the tool on a section of pipe.

A support plate 10 is used to mount the tool to the component that is being repaired (pipe section, elbow or valve as examples) such as depicted in FIGS. 1 and 2.

Telescoping rods 22 will attach the support plate 10 to the tool and maintain the appropriate depth as the tool is being used.

Figure 4:
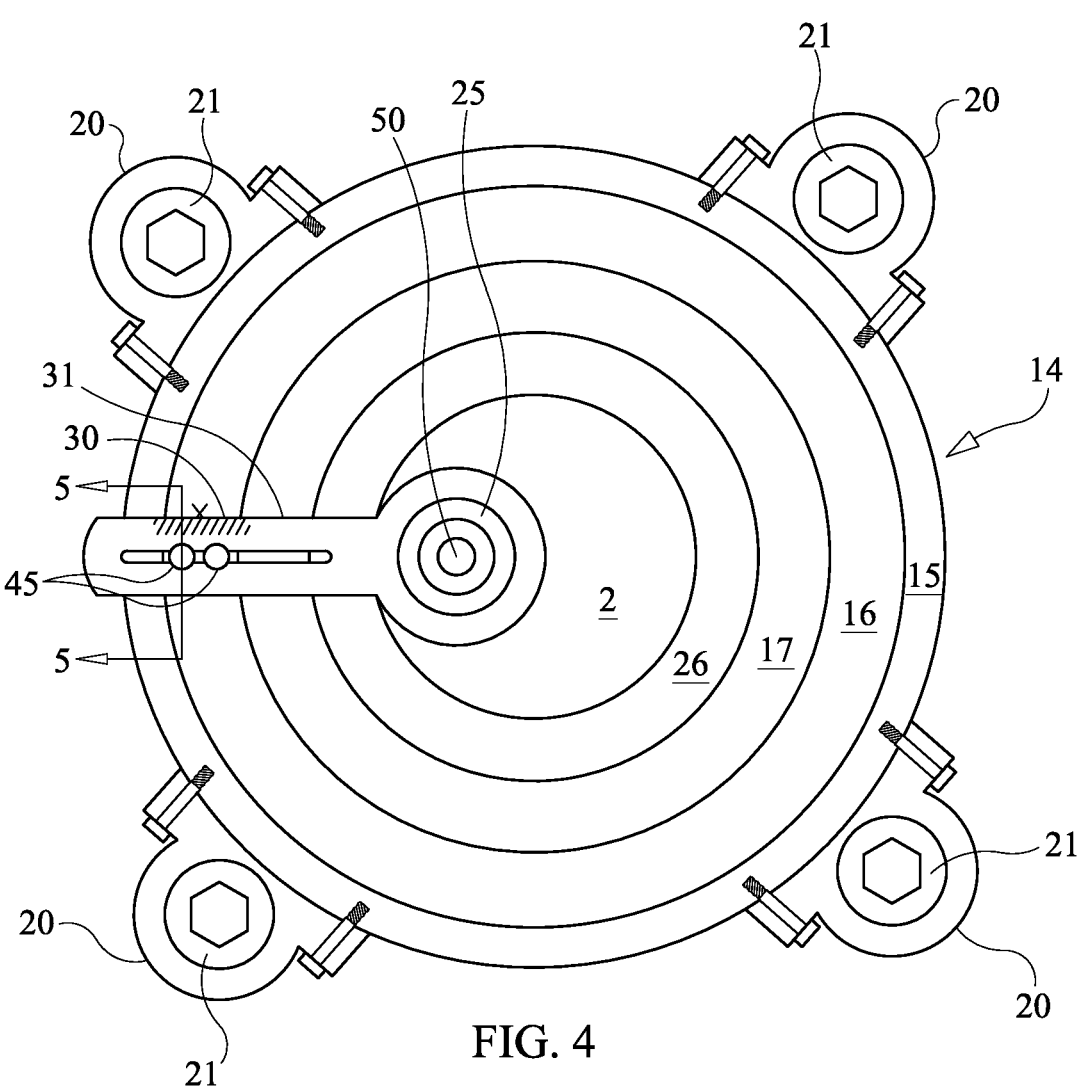
FIG. 4 is a front view of the tool depicting the interior of a pipe and the tool installed to the pipe and depicting the guide bearing.

The concept is the same, regardless of the specific configuration. In operation, in the example of a piping system, such as depicted in FIG. 4, the tool is mounted to a section of piping. The piping is cut into sections to expose the interior of the pipe, 2. A plurality of bearing mounts, 20, will be installed on a main bearing 14, which is further comprised of an outer race 15 and an inner race 16; there are two holes 16A and 16B for two mounting screws to lock the adjustable arm 31 in place. The outer race 15 will encapsulate or cover the pipe; as the tool is used the bearing mounts will secure the tool in place during the operation of the tool. The bearing mounts 20 will be installed on the main bearing. Each of the bearing mounts 20 will have an opening 21 to secure a telescoping mounting rod 22 to ensure a consistent depth of the tool after the tool has been secured to the pipe, valve, or elbow. The bearing mounts will be equally spaced around the circumference of the pipe and that spacing will ensure that the grinding tool remains in the same position as it is rotated and grinds the excess weld material. The support plate 10 may be a solid piece or have two sections such as depicted in FIG. 2.

An adjustable arm 31 is attached to the inner race 16. The tool consists of an integrated scale 30 on the adjustable arm 31 that is attached to the side of the bearing; the scale has gradients and a locking device 45 so that the position of the tool can be positioned and then set at a uniform distance to produce a uniform result within the interior 2 of the pipe section 26. The adjustable arm 31, will have a mounting arm with a scale, 30, and one end will house a guide bearing, 25, in which to mount the bur tool. The user of the device will mount a bur tool through the guide bearing opening 50 so that it contacts the excess weld material in the interior of the pipe that must be removed. The burring tool will remain in a constant position relative to the center of the pipe as the grinding tool is rotated in the interior of the pipe. The guide bearing 25 will ensure a consistent interior surface, as the tool is rotated, and the tool will produce a uniform interior surface within the diameter of the piping. The process may be repeated on the exterior of the pipe.

First Embodiment

The tool may be used on a valve configuration, such as depicted in FIG. 1. A vertical support plate for a valve, 10, will be mounted to the valve 55 with a corresponding horizontal plate, 5. Telescoping rods 22 will be inserted into the opening of the bearing mounts and the stop 40 will ensure that the telescoping rods 22 are at uniform depths to produce a uniform repair. The excess weld material, A, which has been added during the welding process is removed by the bur tool 3.

Second Embodiment

Another embodiment in which this tool can be used is when a section of pipe material must be restored such as depicted in FIGS. 2 and 4. FIG. 2 is the side view of this embodiment and FIG. 4 is a front view of the embodiment with a view to the interior 2 of a section of piping. In the pipe configuration, there is a support plate, 10, on which the bearing mount (not depicted in FIG. 2 or FIG. 3) is mounted. The support plate may be one piece or may come in sections such as depicted in FIG. 2. Four bearing mounts 20 surround the piece that is to be repaired.

Each of the bearing mounts 20 are secured to the outer race 15 of the main bearing 14 with a type of attachment means; the attachment means is likely to be bolts but other means of attachment may be anticipated. The bearing mounts 20 secure the telescoping rods 22; the main bearing 14 is comprised of an outer race 15 and an inner race 16. The adjustable arm 31 is secured to the inner race 16 and rotates as the tool is used. An empty space 17 is proximate to one edge of the inner race 16. The pipe 26 that is to be repaired is placed adjacent to the empty space after the tool has been installed.

FIG. 2 is a depiction of a side view of the support plate in sections (likely a clam shell configuration) and a section of piping with excess weld material A; the base metal repair that is represented by FIG. 4 is being used to repair the interior 2 diameter of a pipe 26 such as depicted in FIG. 4. The interior of the piping 2 is surrounded by the inner bearing race 16 and outer race 15. Bearing mounts 20 are equally spaced along the perimeter of the outer race 15; four bearing mounts 20 are depicted on FIG. 4. Within each bearing mount is an opening 21 through which a telescoping rod 22 (not depicted) is installed; the placement of the telescoping rod 22 through the opening 21 ensures that the tool remains in one place during the operation of the base metal repair and end prep. The number of telescoping rods 22 is determined by the craftsman; at least two telescoping rods should be used. A stop 40 such as depicted in FIG. 1 is provided on each of the telescoping rods 22 to provide a uniform depth of the grinding tool within the interior of the pipe 2. A stop 40 should be used for every telescoping rod 22 that May be used.

An adjustable arm 31 is secured to the inner race 16; the adjustable arm 31 and the inner race 16 rotate together as the tool is used.

Gradations 30 on the adjustable arm are provided to measure the length of the tool within the interior of the pipe; the grinding tool (not depicted) is placed through the opening 50. A pair of screws 45 are provided to lock the grinding tool (not depicted) in place relative to the center of the pipe section. A smaller guide bearing 25 is provided on the adjustable arm; the bur tool (not depicted) is placed through the opening 50 of the smaller guide bearing. The smaller guide bearing 25 remains in place during the operation of the tool. The bur tool rotates in a circle around the interior of the pipe to remove the excess weld material A.

If a different distance is required within the interior of the pipe the screws 45 are loosened and the adjustable arm 31 is moved to set the desired distance. A pair of screws 45 are used to ensure that the grinding tool remains in a constant position relative to the side of the interior of the component during the base metal repair.

Figure 5:
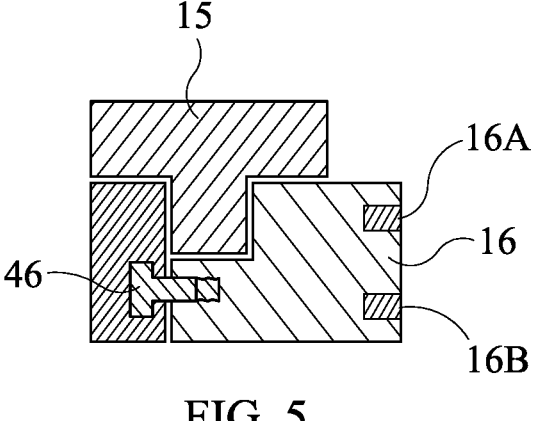
FIG. 5 is a cross section according to line 5-5 on FIG. 4
Figure 6:
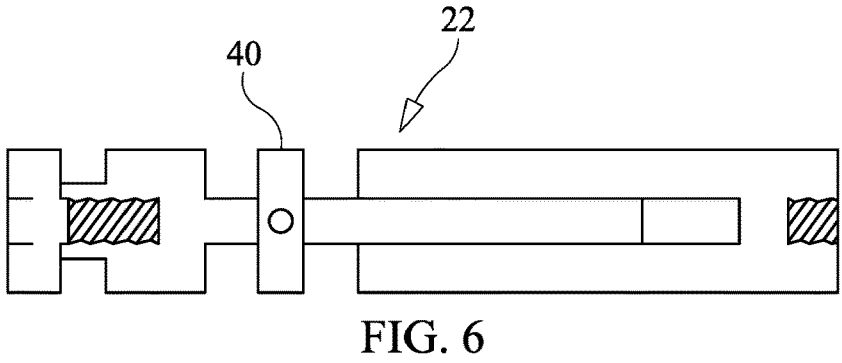
FIG. 6 is depiction of the telescoping mounting rod.
Figure 7:
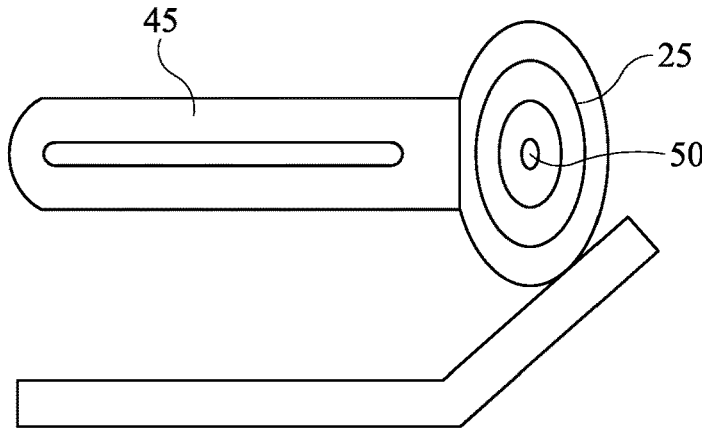
FIG. 7 is the depiction of the tool to application on a beveled surface.

Referring to FIG. 5 the inner race take down bolts 46 will lock down the position of the inner bearing race 16 and the outer bearing race 15. The inner bearing race 16 is slightly longer than the surface of the outer bearing race 15 and will rotate as the tool is rotated around the section of pipe. The take down bolts 46 are used to assemble the pieces of the tool.

Two sections of the support plate, 10, may also be used and will be attached to the section of piping, and the bur grinder is placed through the center of the opening 50 as depicted in FIG. 4 to ensure a uniform distance that will ensure that the excess weld material that is represented by A will be removed in a uniform fashion to produce a uniform finish.

Third Embodiment

Figure 3:
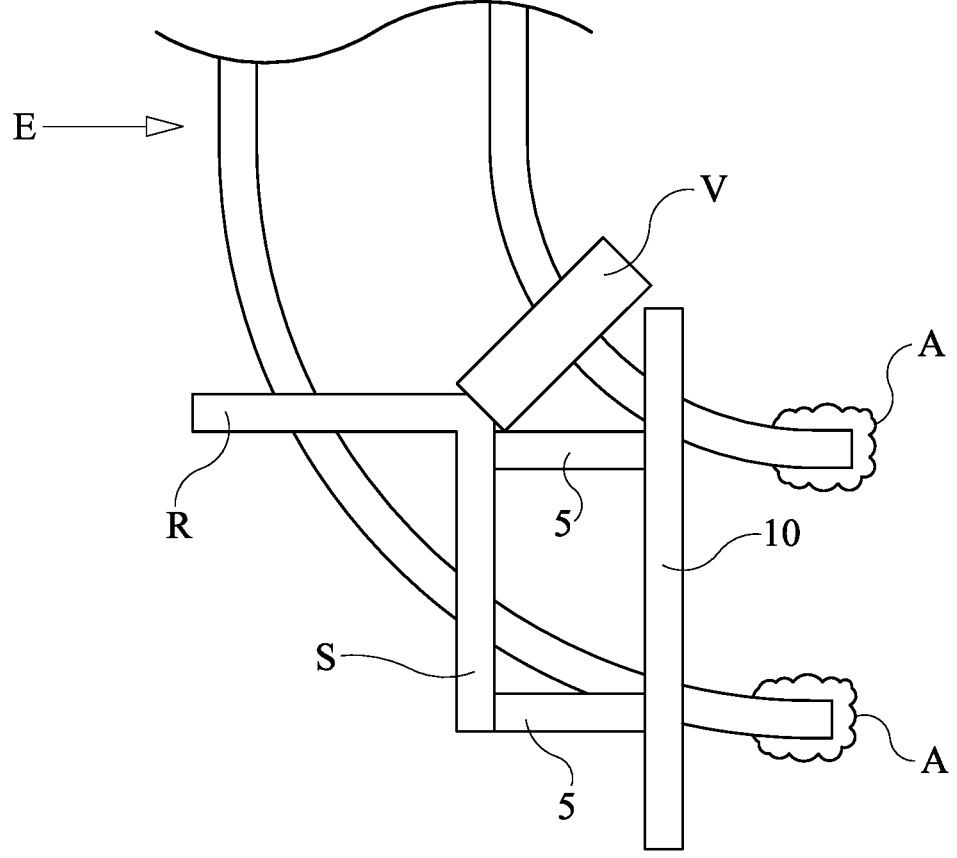
FIG. 3 is a side view of the tool on a pipe elbow.

The third embodiment is represented by FIG. 3 and is represented by the tool being used on an elbow configuration—E. In FIG. 3 there are two sections represented by R and S; these sections represent a piece of angle iron that is used to secure the tool to the elbow; the component V is a metal strap that is used to secure the tool to the throat of the elbow. The Number 5 represents a horizontal support members and number 4 is the support plate for an elbow that is used to mount the tool. The bur tool is placed through the opening for the bur tool 50 (as depicted in FIG. 4). Elbows are frequently used in shipboard piping systems and are commonplace in shipboard applications.

Figure 8:
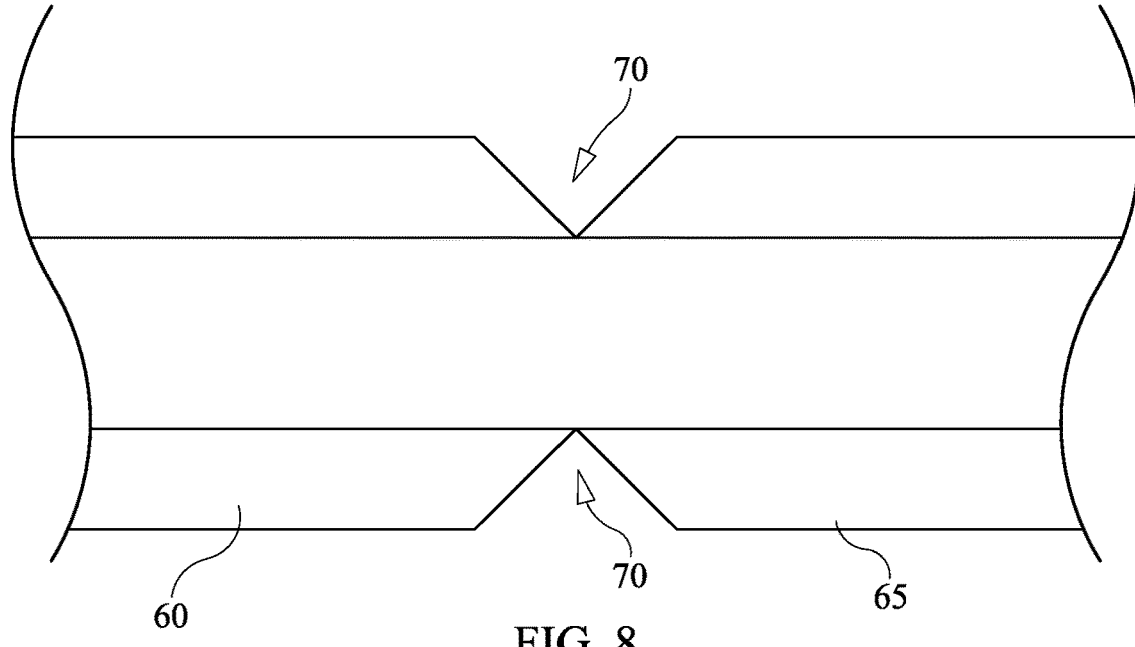
FIG. 8 is a depiction of two components with a beveled surface depicting an existing component and a new component.

The tool may be used to join two pieces of a piping system as depicted in FIG. 8. An existing component 60 is joined to a new component 65. The two sections abut and weld material is put into the open space 70 and the excess weld material has been removed to ensure a completed fit-up.

While the embodiments of the invention have been disclosed, certain modifications May be made by those skilled in the art to modify the invention without departing from spirit of the invention.

The invention claimed is:

1. A tool to remove excess weld material from a section of piping, which is comprised of:

a main bearing, wherein the main bearing is further comprised of an outer bearing race and an inner bearing race, a support plate, wherein the support plate is mounted to a section of piping, wherein the main bearing is mounted to the support plate, wherein the support plate secures the main bearing, wherein a plurality of telescoping rods attach the support plate to the main bearing, wherein an adjustable arm is provided, wherein the adjustable arm is integral to the inner bearing race, wherein the adjustable arm will rotate with the inner bearing race, wherein the adjustable arm has a first end and a second end, wherein an opening is provided on the second end of the adjustable arm, a guide bearing on the second end of the adjustable arm, wherein a grinding tool is inserted into an opening of the guide bearing, wherein the adjustable arm has gradations, a locking mechanism for the adjustable arm, wherein the locking mechanism for the adjustable arm secures the position of the adjustable arm, wherein an opening is provided on a guide bearing mount, wherein the adjustable arm sets the distance of the grinding tool from a side of the piping, wherein four guide bearing mounts are placed around a circumference of the main bearing, at least one of a plurality of telescoping rods is inserted through a corresponding opening of one of the four guide bearing mounts, a stop, wherein a stop is provided on each of the plurality of telescoping rods, wherein the stop sets the depth of the grinding tool within the section of piping.

2. A tool to remove excess weld material as described in claim 1 wherein a pair of set screws are provided for the locking mechanism for the adjustable arm.

3. A tool to remove excess weld material from a valve section, which is comprised of:

a vertical support plate, wherein the vertical support plate is mounted to a component being repaired, a horizontal support plate, wherein the vertical support plate is secured to the horizontal support plate, wherein the horizontal support plate is secured to bolts of the valve section, a main bearing, wherein the main bearing is mounted to the vertical support plate, wherein the vertical support plate secured the main bearing, wherein a plurality of telescoping rods attaches the vertical support plate to the main bearing, wherein the main bearing is further comprised of an outer race and an inner race, wherein the main bearing is mounted to the vertical plate, wherein four guide bearing mounts are placed on the outer bearing race and around the circumference of the main bearing, wherein the inner bearing race is integral to an adjustable arm, wherein the adjustable arm rotates with the inner race, wherein the adjustable arm has gradations, wherein the adjustable arm has a first end and a second end, wherein an opening is provided on the second end of the adjustable arm, a locking mechanism, wherein the locking mechanism fixes the position of the adjustable arm, wherein a plurality of rods are inserted through each of the openings on the four guide bearing mounts, wherein the plurality of rods can telescope within the openings of the guide bearing mounts, a stop, wherein a stop is provided on each of the plurality of rods.

4. A tool to remove excess weld material from an elbow which is comprised of:

a main bearing, wherein the main bearing is further comprised of an outer race and an inner race, a support plate, wherein the support plate is mounted to a piece that is being repaired, wherein a plurality of telescoping rods secure the tool to the support plate, a plurality of the guide bearing mounts are provided on a circumference of the outer race, wherein the main bearing is mounted to a vertical plate, an adjustable arm, wherein the adjustable arm is integral to the inner race, wherein the adjustable arm has gradations, a locking mechanism, wherein the locking mechanism fixes the position of the adjustable arm, wherein the adjustable arm has a first end and a second end, wherein an opening is provided on the second end of the adjustable arm, wherein openings are provided on the guide bearing mounts, a plurality of telescoping rods, wherein at least one of the plurality of telescoping rods is inserted through a corresponding opening of one of the four guide bearing mounts, wherein the rods set the depth of the tool in a pipe, wherein a piece of angle iron is affixed to the elbow, a strap, wherein the strap secures the tool to a throat of the elbow, a pair of horizontal support members, a vertical support member, wherein the horizontal support members are attached to the vertical support member, wherein the main bearing is mounted to the exterior of an elbow in proximity to the throat of the elbow.

* * * * *